(12) United States Patent
Ninow

(10) Patent No.: US 12,096,874 B2
(45) Date of Patent: Sep. 24, 2024

(54) PRESSURE-COOKING DEVICE

(71) Applicant: SURVIVOR PRODUCTS LLC, Herriman, UT (US)

(72) Inventor: F. P. Ninow, Herriman, UT (US)

(73) Assignee: SURVIVOR PRODUCTS LLC (A DELAWARE LLC), Herriman, UT (US)

( * ) Notice: Subject to any disclaimer, the term of this patent is extended or adjusted under 35 U.S.C. 154(b) by 436 days.

(21) Appl. No.: 17/460,109

(22) Filed: Aug. 27, 2021

(65) Prior Publication Data
US 2023/0068407 A1    Mar. 2, 2023

(51) Int. Cl.
*A47J 27/08*     (2006.01)
*A47J 27/086*    (2006.01)

(52) U.S. Cl.
CPC ......... *A47J 27/0804* (2013.01); *A47J 27/086* (2013.01)

(58) Field of Classification Search
CPC ............................ A47J 27/0804; A47J 27/086
USPC ......................................................... 126/1 R
See application file for complete search history.

(56) References Cited

U.S. PATENT DOCUMENTS

| | | | |
|---|---|---|---|
| 1,681,150 A | | 8/1928 | Vischer |
| 2,499,828 A | * | 3/1950 | Kuriloff ............ A47J 27/0804 292/254 |
| 4,627,417 A | * | 12/1986 | von der Becke ... A47J 27/0813 126/369 |
| 5,092,229 A | * | 3/1992 | Chen .................... A47J 27/0811 126/369 |
| 5,277,326 A | | 1/1994 | Chiba |
| 5,355,777 A | * | 10/1994 | Chen ....................... A47J 39/00 99/413 |
| 5,632,403 A | * | 5/1997 | Deng ..................... A47J 27/08 220/592.2 |
| 6,263,787 B1 | * | 7/2001 | Tseng ................... A47J 27/004 99/413 |
| 6,305,272 B1 | * | 10/2001 | Lin ...................... A47J 27/002 220/573.1 |
| 6,698,337 B1 | | 3/2004 | Park |
| 7,086,326 B2 | | 8/2006 | Yokoyama |

(Continued)

FOREIGN PATENT DOCUMENTS

| | | |
|---|---|---|
| KR | 101220087 B1 | 1/2013 |
| KR | 101377930 B1 | 3/2014 |
| TW | M452726 U | 5/2013 |

*Primary Examiner* — Avinash A Savani
(74) *Attorney, Agent, or Firm* — Jason P. Webb; Pearson Butler

(57) ABSTRACT

A pressure-cooking device including: a base pot having a plurality of shells, the shells hermetically sealed together and forming a cavity therebetween and forming a receptacle thereinside; an inner pot shaped and sized to rest within the receptacle of the innermost shell and is selectably removeable therefrom, wherein the inner pot leaves a gap between the bottom of the inner pot and the bottom of the innermost shell when resting within the innermost shell; a solid cylindrical nonmetallic thermal body shaped to fit within the gap, the thermal body selectably removeable from the gap; a pressure relief mechanism; and a cover having a hollow interior, as well as a gasket shaped and positioned to hermetically seal an inside portion of the pressure-cooking device when closed, wherein the unpowered pressure-cooking device does not include any electrically powered heating elements.

16 Claims, 5 Drawing Sheets

(56) References Cited

U.S. PATENT DOCUMENTS

| | | | |
|---|---|---|---|
| 7,097,064 B2 | 8/2006 | Cheng et al. | |
| 7,148,451 B2 * | 12/2006 | Miyake | A47J 27/004 |
| | | | 426/507 |
| 8,689,680 B2 * | 4/2014 | Park | A47J 36/36 |
| | | | 126/29 |
| 2005/0139589 A1 * | 6/2005 | You | A47J 27/004 |
| | | | 219/436 |
| 2006/0076006 A1 * | 4/2006 | Duguay | F24C 15/34 |
| | | | 126/271.1 |
| 2006/0185662 A1 * | 8/2006 | Kim | A47J 36/04 |
| | | | 126/390.1 |
| 2011/0067842 A1 | 3/2011 | Campbell et al. | |
| 2012/0085243 A1 | 4/2012 | Park | |
| 2015/0313399 A1 | 11/2015 | Park | |

* cited by examiner

PRESSURE-COOKING DEVICE

BACKGROUND OF THE INVENTION

Field of the Invention

The present invention relates to cooking devices, specifically to pressure-cooking devices.

Description of the Related Art

Efficiently preparing meals when away from electricity is becoming more difficult as devices continue to include multiple additional electrical components such as various sensors, heating elements, LED screens, switches, and the like. Further, even if meals are prepared using electricity, it is a challenge to keep those meals warm when another device necessitates the use of the outlet it is plugged into, when the meal needs to be subsequently transferred to another location, or if the meal is to be consumed at a later time.

There are ways to prepare meals away from electricity, such as creating a fire or having a portable gas stove and holding pots or pans over the flame, bringing along MREs or other self-cooking meals, or setting up solar cookers. Such usually involve lugging around multiple different pieces of bulky equipment, cannot be easily transported as they are easy to spill and difficult to keep warm, require a lot of time, and/or simply taste awful.

In the related art, it has been known to use different variations of pressure-cooking or slow-cooking devices which are able to both cook and contain meals, as well as keep those meals relatively warm for a period of time. These pressure-cooking and slow-cooking devices require electricity to heat up and cook, contain hot spots or otherwise do not heat evenly, and although they are designed to retain heat fairly well, oftentimes do not retain enough heat to keep everything cooking for extended periods of time. Accordingly, these devices oftentimes do not function or perform as well as desired by the user.

Examples of references related to the present invention are described below in their own words, and the supporting teachings of each reference are incorporated by reference herein:

U.S. Pat. No. 6,263,787, issued to Tseng et al., discloses a thermal cooker having high insulating efficiency and capable of boiling and smothering food is provided. A thermal storage ring is connected to an outer bottom surface of an inner pot of the thermal cooker to be heated along with food in the inner pot until the food is boiled. The inner pot with boiled food and heated and glowing thermal storage ring is then positioned into an outer pot and closed with inner and outer lids, so that food in the inner pot is kept boiling with heat released from the thermal storage ring and then be smothered in the thermal cooker for a period of time.

U.S. Patent Application Publication No.: 2015/0313399, by Park, discloses a cooking apparatus having a dual wall structure, including inner and outer shells. The inner shell is disposed adjacent the outer shell and the edges of the shells are hermetically sealed to form a cavity between the shells. In some embodiments, the cooking apparatus has a low-pressure creating lid, including a disk with an aperture, a pressure release valve installed on the aperture, and a rim that surround the disk.

U.S. Patent Application Publication No.: 2012/0085243, by Park, discloses an eco green cookware, having a double-layered wall structure and comprising a heat transfer medium within a cavity of the double-layered wall structure. The eco green cookware comprises: a container comprising an inner shell and an outer shell, wherein upper parts of the inner shell and outer shell are rolled a number of times together to form a rolled joint, an upper part of the inner shell is provided with a concave member, a heat transfer medium is provided within said cavity, a first heat transfer member is inserted and installed at the bottom portion of said cavity, and a second heat transfer member is affixed to the bottom surface of the first heat transfer member; an inner cover comprising an inner peripheral portion in the form of an inverted "L" whose inside bend forms a round portion; an outer cover; and pressure release devices.

European Patent Application Publication No.: EP2818083A3, by Park, discloses a cooking vessel having a double-layered wall structure, comprising an inner shell and an outer shell. A silicon ring is disposed between the top and bottom flanges of the inner and outer shells. The knob of the cover of the cooking vessel is provided with a means for gauging temperature whose bottom portion is extended to inside the cooking vessel. A heat conduction plate is affixed to the bottom surface of the inner shell and a plurality of raised ridges are formed on the bottom surface of the outer shell. Additionally, the cooking vessel further comprises a cover and a plurality of embossed ridges are formed in an inner surface of the cover. The cooking vessel further comprises a pressure releasing device for releasing the pressure within the inner space between the inner and outer shells.

The inventions heretofore known suffer from a number of disadvantages which include: inability to cook on the go, expensive, not environmentally friendly, not energy efficient, difficult to use, dangerous to operate, not able to fully cook food, require a constant electrical source, creates hot spots and burn food, and do not retain nutrients from the food.

What is needed is a pressure-cooking device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available pressure-cooking devices. Accordingly, the present invention has been developed to provide a satisfactory pressure-cooking device.

There may be an unpowered pressure-cooking device which may include one or more of the following: a base pot which may have a plurality of shells, the shells may be hermetically sealed together and may forming a cavity therebetween and may forming a receptacle thereinside, an inner pot that may be shaped and sized to rest within the receptacle of the innermost shell and may be selectably removeable therefrom, the inner pot may leave a gap between the bottom of the inner pot and the bottom of the innermost shell when resting within the innermost shell, a removable nonmetallic thermal body which may be shaped to fit within the gap, the thermal body may be the sole and only heating element of the unpowered pressure-cooking device, a cover which may have a gasket which may be shaped and/or positioned to hermetically seal an inside portion of the pressure-cooking device when closed, the unpowered pressure-cooking device may not include any electrically powered heating elements, a pressure relief mechanism which may be positioned to be in functional communication with an interior of the inner pot when the inner pot may be disposed within the base pot, the pressure relief mechanism may extend through the cover from a top surface thereof to a bottom surface thereof, the cover may be selectably attachable to the base pot, the pressure relief mechanism may include a spring, the pressure relief mechanism may include a ball, the thermal body may include a lifting section which may allow a user to lift the thermal body without needing to grasp the thermal body, a lid which may rest within the inner pot, the cover may be hollow, the inner pot may further include handles which may stick out of the device when the cover is closed, and the gasket may creates a hermetic seal with the top of the inner pot.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
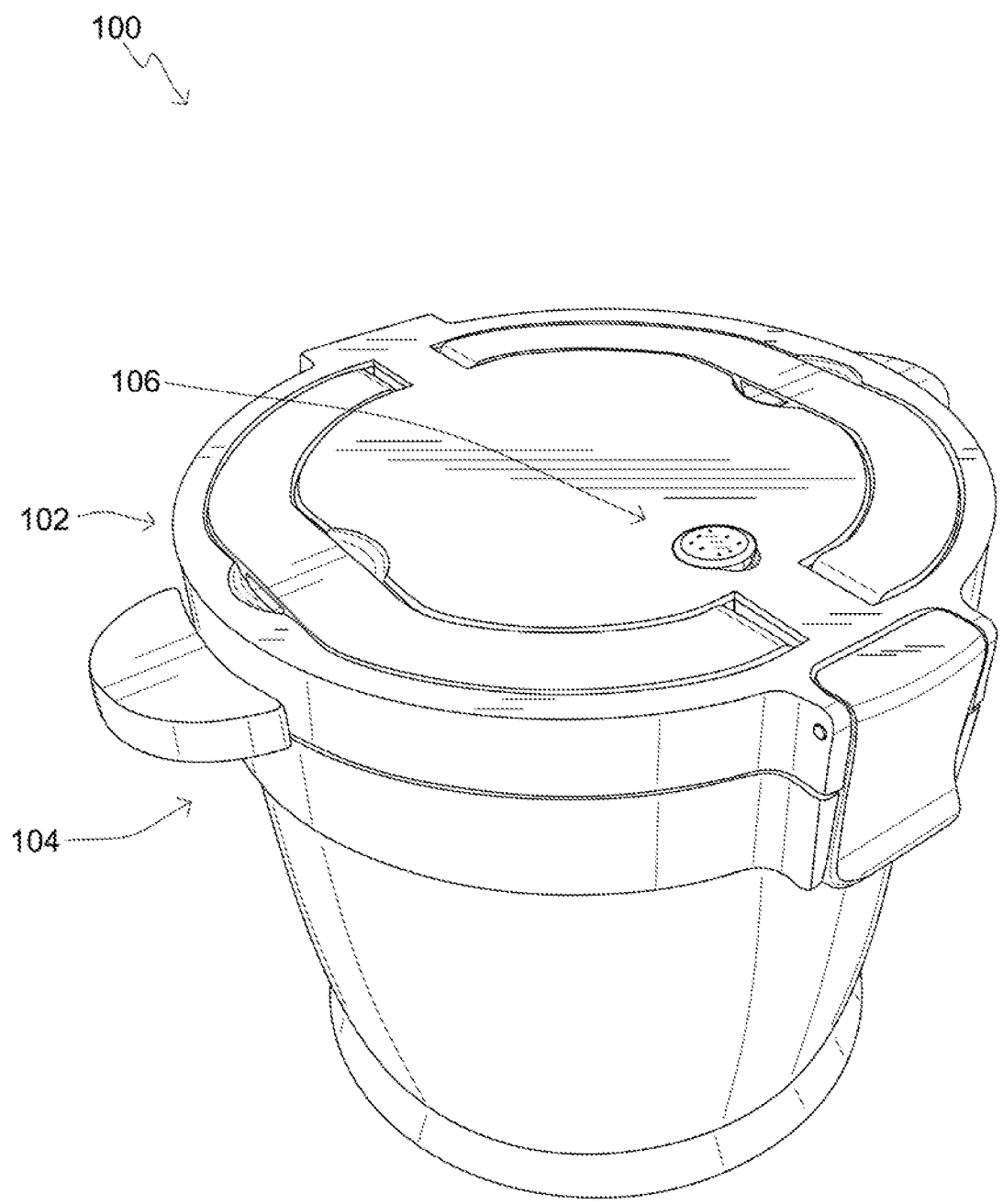
FIG. 1 is a top perspective view of a pressure-cooking device, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a top perspective view of a pressure-cooking device, according to one embodiment of the invention. There is shown a pressure-cooking device 100 including a cover 102 pivotally coupled on one end to a base 104 and rigidly coupled to the base 104 on a second end. The illustrated pressure-cooking device does not require power to operate, allowing it to be used in situations where power is not available or easily accessible.

In order to effectively pressure cook, the pressure-cooking device 100 includes a pressure relief system 106. The illustrated embodiment shows the pressure relief system 106 built into the cover. When assembled as shown, the pressure-cooking device 100 is completely self-contained and has no parts that will be easily dislodged. However, each part of the pressure-cooking device 100 is removeable such that it is easy to clean each part of the pressure-cooking device 100 and/or replace any parts that become worn and/or damaged.

Figure 2:
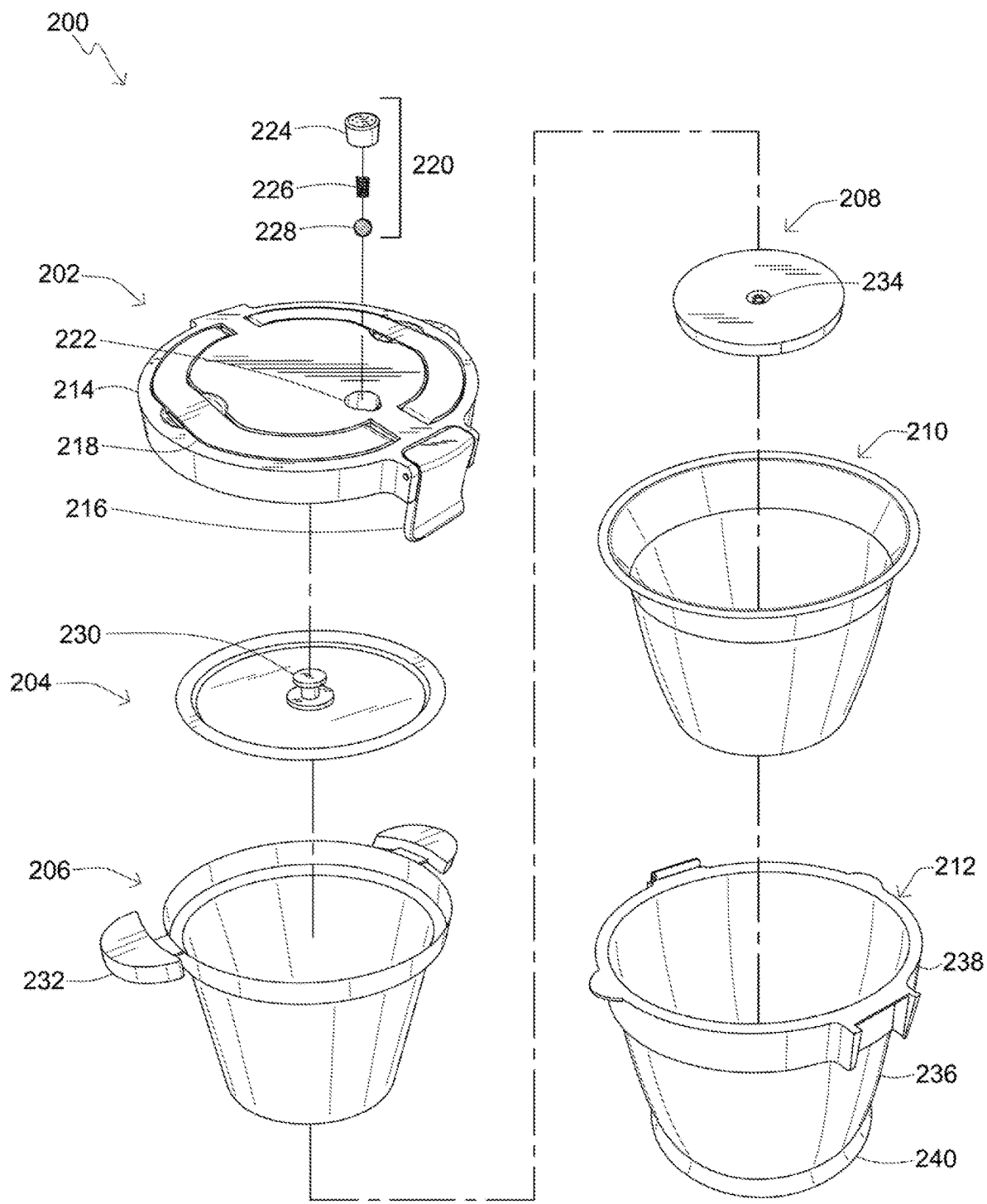
FIG. 2 is an exploded view of a pressure-cooking device, according to one embodiment of the invention.

FIG. 2 is an exploded view of a pressure-cooking device, according to one embodiment of the invention. The illustrated pressure-cooking device 200 includes a cover 202, an inner pot lid 204, an inner pot 206, a heating stone 208, an outer pot 210, and a base 212.

The illustrated cover 202 is pivotally connected to the base 212 and includes a cover lid 214, a latch 216, handles 218, and a pressure relief system 220. The bottom of the cover lid 214 is designed to fit together with the top of the base 212 and includes various indents, slots, flanges, and other structure wherein the other pieces of the cover 202 are positioned. The cover lid 214 includes a through hole 222 wherein the pressure release system 220 is located. As shown, the cover lid is hollow, however in other embodiments the cover lid may be a single solid piece. The cover 202 also includes a silicone ring which rests within a groove of the cover lid 214 and seals around the top of the inner pot 206.

The illustrated latch 216 is pivotally connected on one end to the cover lid 214 through a pin connection. The latch 216 is selectably coupled on another end to the base 212. When the latch 216 is coupled to the base 212, the cover lid 214 is then rigidly connected to the base 212. The latch 216 may be any number of fastening devices, including but not limited to screws, clamps, clasps, clips, hook-and-loops, straps, magnetic, pin connectors, and the like and combinations thereof.

The illustrated handles 218 are pivotally connected to the cover lid 214 through a pin connection, such that they may pivot away from the cover lid 214 and be grasped by a user. The handles 218 may be connected to the cover lid 214 in any number of ways or with any number of connections, which may allow the handles 218 to be coupled to the cover lid 214 rotatably, rigidly, extendably, and the like and combinations thereof. In some embodiments, the handles 218 may be formed with the cover lid 214 such that they are unable to be removed from the cover lid 214. In other embodiments, the handles 218 may instead be coupled to the base 212.

The illustrated pressure relief system 220 includes a cap 224, a spring 226, and a ball 228. The cap 224 fits within the through hole 222 of the cover lid 214 and is friction fit to the cover lid 214 such that when the pressure relief system 220 is activated, the cap 224 remains in place and is not dislodged from the cover lid 214. In other embodiments, the cap 224 may be snap fit, press fit, or otherwise mechanically fastened such that it is not dislodged. The ball 228 rests within the through hole 222 of the cover lid 214 and fully occludes a section of the through hole 222. The spring 226 is wedged between the cover 224 and the ball 228. There may be multiple variations of the spring 228 with different compression ratios or springs with adjustable spring ratios such that the pressure inside the pressure-cooking device 200 may be set to be released at a different level if the user desires.

The illustrated inner pot lid 204 and inner pot 206 rests within the outer pot 210, however do not rest directly on the heating stone 208, and instead leaves a small gap between the bottom of the inner pot 206 and the heating stone 208. The illustrated pot lid 204 includes a pot lid handle 230 which is rigidly affixed to the inner pot lid 204 and allow a user to safely access the contents of the inner pot 206 without burning or otherwise injuring the user. The inner pot 206 includes pot handles 232 which are rigidly affixed to the inner pot 206 and allow a user to safely remove the inner pot 206 without burning or otherwise injuring the user. Further, the pot handles 232 are long enough such that they extend to the outside of the pressure-cooking device 200 and are sandwiched between the cover lid 214 and the base 212 such that the remain cool even when the pressure-cooking device 200 is in use. Additionally, a user may use the pot handles 232 to move the entire pressure-cooking device 200 when the cover lid 214 is rigidly connected to the base 212.

The illustrated heating stone 208 rests within the outer pot 210 and includes an eye hook 234. The heating stone 208 may be any number of materials which may retain heat for an extended period of time, be strong and durable, as well as resist extreme temperatures without cracking, warping, significantly expanding, or disintegrating. Examples of such materials may include, but are not limited to concrete, cement, refractory cement, brick, soapstone, marble, basalt, gypsum or other stone, various metals, and the like and combinations thereof. As illustrated, the eye hook 234 is rigidly connected to the heating stone 208 within an indent in the heating stone 208, such that in some embodiments, the inner pot 206 may securely rest on the topside of the heating stone 208. The eye hook 234 is made of a heat-resistant material and allows a user to easily and safely deposit a hot heating stone 208 within the outer pot 210 without the user risking serious burns or other injury, and may be any number of protrusions such that it may be easily grabbed or hooked. Some variations of the eye hook include loops, d-rings, hooks, and the like. The heating stone 208 is shown as being cylindrical in shape, however, may be formed in any number of regular or irregular shapes to fit different enclosures. Further, in some embodiments, the heating stone may be affixed to or formed with the inner pot 206 or outer pot 208 such that the heating stone 208 is not separable from the affixed pot.

The illustrated outer pot 210 is rigidly affixed to the base 212 such that the connection between the inner pot 210 and the base 212 is airtight and allows a vacuum to be formed between one another. In the illustrated embodiment, only the top of the outer pot 210 is affixed to and sealed to the top of the base 212 to minimize heat transfer from the outer pot 210 to the base 212, and the outer pot 210 is not selectably attachable and detachable from the base 212. The outer pot 210, similar to the inner pot 206, is made of a strong, hard material which is scratch, heat, and corrosion resistant, such various metals, stones, bricks, or ceramics, and may be coated or plated with various metals or epoxies to assist with durability and corrosion resistance.

The illustrated base 212 is connected to the outer pot 210 and includes a shell 236, a top section 238, and a bottom section 240. The shell 236 is of identical structure and material to the outer pot 210, however due to the isolation from the heating stone 208, in some embodiments the shell 236 may instead be made of a lighter weight and/or less heat resistant material such as hard plastics. The top section 238 is rigidly affixed to the top of the shell 236 and includes structure to enable it to be affixed to the cover lid 214. The top section 238 also includes smaller handle-shaped protrusions which assist in keeping the handles of the inner pot 210 in place so the inner pot 210 does not rotate. The bottom section 240 is rigidly affixed to the bottom of the shell 236 and spaces the shell 236 from the ground as well as provides a stable base to assist the pressure-cooking device 200 in remaining upright. The bottom section 240 may include friction enhancing material such as rubber, silicone, soft plastics, and the like and combinations thereof in order to assist the pressure-cooking device 200 from sliding.

The inner pot 206, outer pot 210, and inner pot lid 204 may be made of any durable and hard material which can withstand high temperatures, which include, but are not limited to metals such as stainless steels, iron, aluminum, and the like, ceramics, brick, cement, glass, porcelain, clay, stone, and the like. The remaining structural pieces of the pressure-cooking device 200 may be made of any material with a high strength-to-weight ratio, such as metals, hard plastics, wood, and the like and combinations thereof. These materials may be plated, coated, or painted to assist in preventing exposure damage such as corrosion or UV damage, or to resist damage and/or deformation from contact with another device or being dropped.

In some embodiments, the shell 240 and the outer pot 210 may be one continuous piece to assist in ensuring a vacuum seal. In other embodiments, the outer pot 210, shell 240, or combined outer pot/shell may include structure such that instead of forming a double-walled vacuum, they form a multi-walled vacuum with additional separating wall structures. Further, there may be handles attached to the base 212. In alternate embodiments, the pressure relief system 220 may be manually activated and include a valve or pressable button, as well as may be located on the side or bottom of the pressure-cooking device.

In operation, the user heats up the heating stone 208. This may be done by placing the heating stone 208 on a stovetop, into a fire, into an oven, or the like. The user then opens the cover 202 and removes the inner pot 206 and places the hot heating stone 208 into the bottom of the outer pot 210. The user then places the inner pot 208 inside the outer pot 210 and over the top of the heating stone 208 and presses the cover 202 until it rigidly locks the cover 202 and the base 212 together.

While heating, pressure is built up inside the pressure-cooking device 200. Pressure within the pressure-cooking device 200 exerts force on pressure relief system 220, specifically the ball 228 occluding the through hole 222. When the pressure reaches a certain threshold, the force on the ball 228 will compress the spring 226 and open up the through hole 222 such that pressure may escape from the pressure-cooking device 200 until the pressure is back below the threshold level. Upon completion of cooking, the user may wait until the device cools down prior to opening the device, or the user may remove the cover 224 which releases the force on the spring 226 and allows the remaining pressure to escape prior to opening the cover 202.

Advantageously, the pressure-cooking device 200 allows a user to cook food without the need for electricity. Further, the vacuum sealed structure allows the inside of the device to stay hot for multiple hours such that the device may transported or left to cook without coming back to cold food. Additionally, the dual-pot structure prevents the inner pot 206 from directly touching the heating stone 208 and walls of the outer pot 210 such that the risk of hot spots and burning of the contents of the inner pot 206 is greatly reduced.

Figure 3:
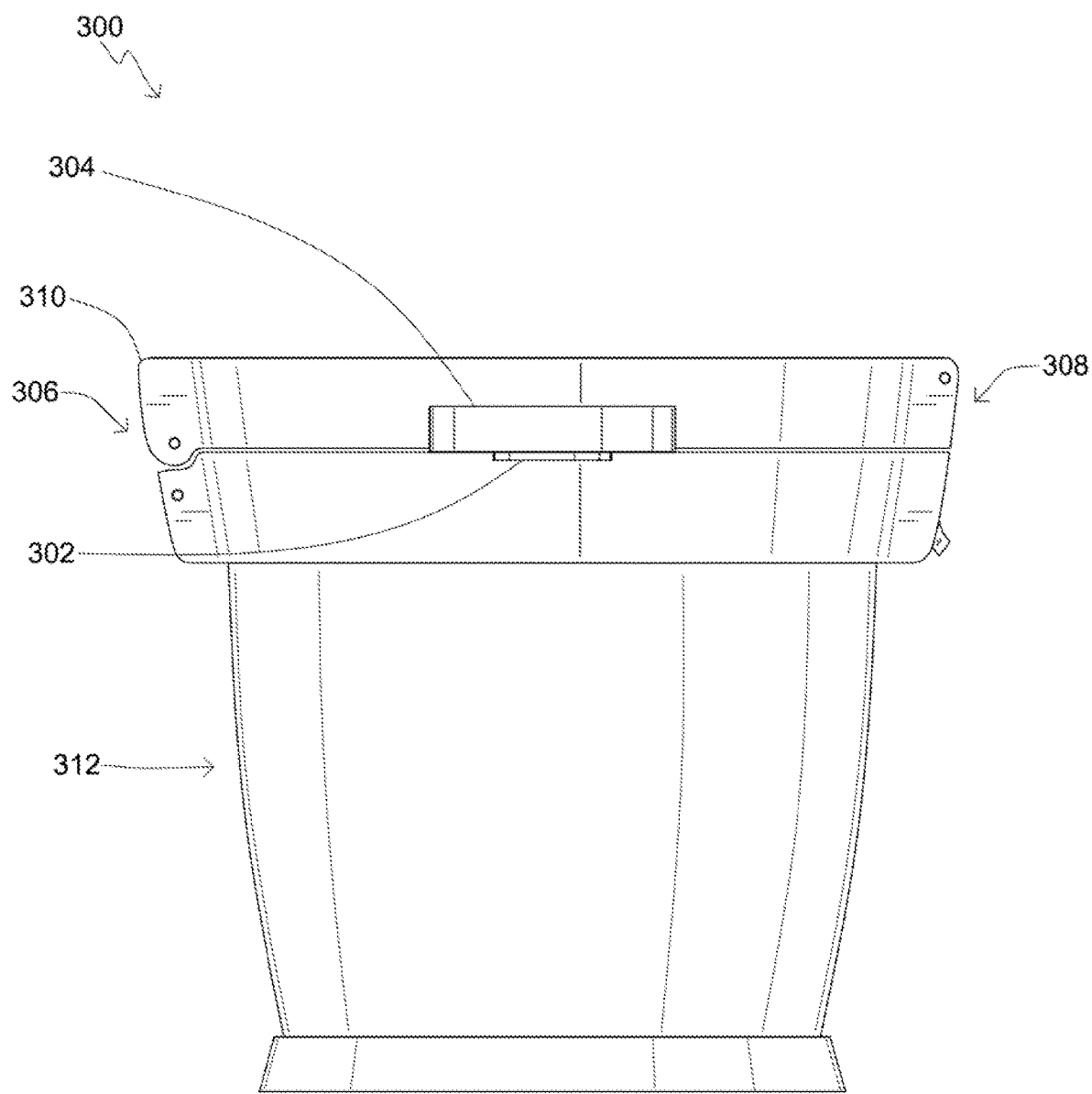
FIG. 3 is a side elevational view of a pressure-cooking device in an installed position, according to one embodiment of the invention.

FIG. 3 is a side elevational view of a pressure-cooking device in an installed position, according to one embodiment of the invention. The illustrated pressure-cooking device 300 is closed and shows the base ears 302 nestled within the inner pot handles 304, such that the inner pot handles 304 are held in place and the inner pot does not spin while the device is closed. Further, the hinge 306 is seen opposite the latch 308, the hinge 306 being affixed to each of the cover 310 and the base 312 via pin connections, while the latch 308 is affixed to the cover 310 via a pin connection and base 312 through the securing of the latch 308. This allows the cover 310 to be securely attached to the base 312 when in use or when transported, however allows the cover to be positioned out of the way when the pressure-cooking device 300 needs to be assembled to cook, or when the device needs to be disassembled to clean.

In some embodiments, there is a second latch positioned on the hinge 306 such that when the latch is activated, it allows a user to fully separate the cover 310 from the base 312. This allows the user a way to get the cover 310 out of the way without having the cover 310 causing the pressure-cooking device 300 to become top heavy and risk tipping over. Further, this allows the pressure-cooking device to remain modular, such that if one or more sections of the device are damaged, the entire unit does not need to be replaced.

Figure 4:
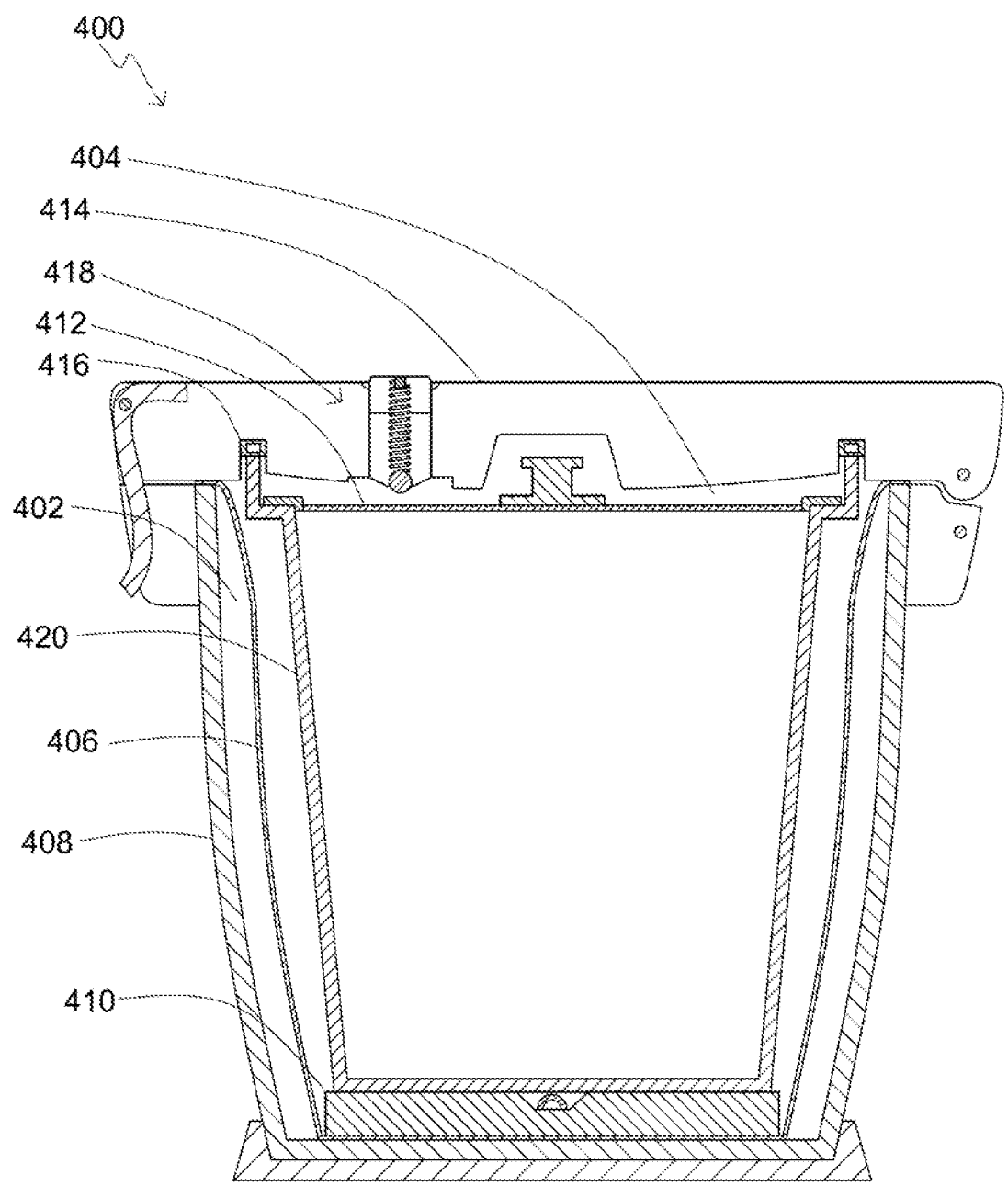
FIG. 4 is a cross sectional view of a pressure-cooking device, according to one embodiment of the invention.

FIG. 4 is a cross sectional view of a pressure-cooking device, according to one embodiment of the invention. The illustrated pressure-cooking device 400 includes a vacuum sealed section 402 and a pressurized section 404. This allows the pressure-cooking device 400 to maintain high or low temperature for long periods of time without an external power source, as well as relieve pressure if there is significant pressure buildup within the device.

The illustrated vacuum sealed section 402 is created by connecting the inner pot 406 and the shell 408 to form an airtight seal. The vacuum sealed section 402 helps reduce the transfer of heat from the heating stone 410 to the environment through. In some embodiments, the vacuum sealed section 402 may be filled with insulation, or there may be multiple vacuum sealed sections 402 to further promote the trapping of heat within the pressure-cooking device.

The illustrated pressurized section 404 is created by the interaction between the lid 412, the cover, 414, the gasket 416, and the pressure relief system 418. As shown, as the pressure-cooking device 400 heats up, pressure will build within the inner pot 420. The lid 412 will hold a small amount of pressure back, however, will slightly lift and release pressure into the pressurized section 404 when the pressure builds higher. The gasket 404 creates a better seal than the lid 412 and traps the escaping pressure within the pressurized section 404 and allows it to build higher. When the pressure reaches a certain threshold, the pressure relief device will be activated and will slowly bleed pressure until the pressure is dropped below the threshold level.

Figure 5:
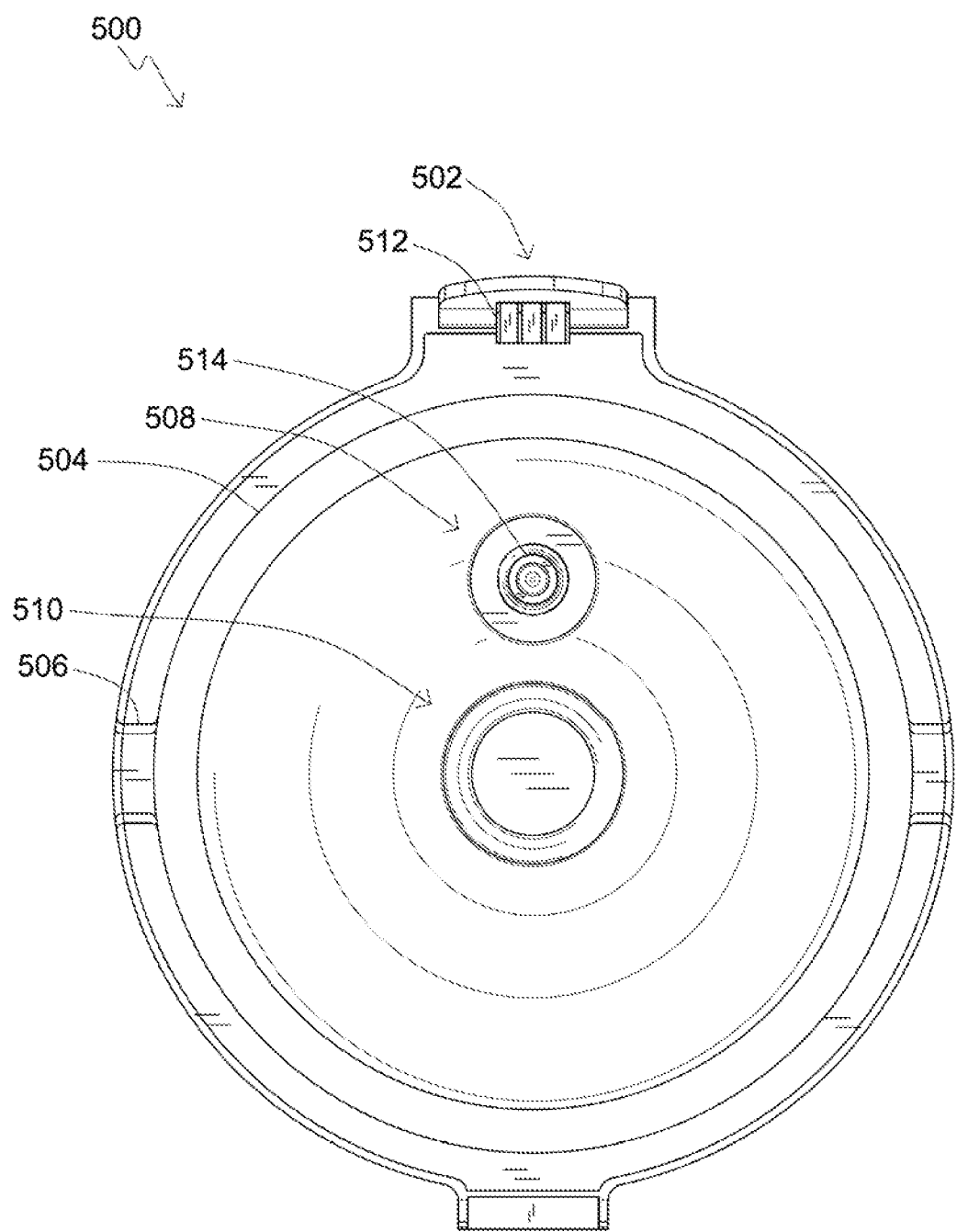
FIG. 5 is a bottom plan view of a cover for a pressure-cooking device, according to one embodiment of the invention.

FIG. 5 is a bottom plan view of a cover for a pressure-cooking device, according to one embodiment of the invention. The illustrated cover 500 includes a latch 502, a gasket 504, lid slots 506, a pressure relief hole 508, and a lid indent 510. Having a cover with many features allows the other sections of the base of a pressure-cooking device to be significantly simpler in design, which allows the manufacture of the pressure-cooking device to be easier and cheaper than having those features be implemented in the base.

The illustrated latch 502 includes a protrusion 512. The protrusion 512 clips underneath a protrusion attached to the base of a pressure-cooking device, which rigidly secures the cover 500 to the base and does not allow the cover 500 to move until the latch 502 is activated to disengage the protrusion 512 from the base.

The illustrated gasket 504 is pressed into an indent in the cover 500 and is sized such that when the cover 500 is closed, the gasket 504 seals around the inner pot of the pressure-cooking device and creates an airtight seal to allow pressure buildup within the device. The gasket 504 is made of a flexible yet heat resistant material such as but not limited to silicone, rubber, cork, flexible plastics, and the like and combinations thereof. In some embodiments, the gasket 504 may be hollow inside to promote extra flexibility or may be notched such that when the cover 500 is shut, the gasket 504 always bends and/or seals in the same spot.

The illustrated lid slots 506 are opposite indents into the cover 500 and allow handles to protrude between the cover 500 and the base when the cover 500 is secured to the base. As seen, there are two lid slots 506 which are directly opposite one another, however in other embodiments, there may be additional or fewer lid slots 506 and/or the lid slots 506 may be shaped to accommodate different sized and shaped lids and/or other handles.

The illustrated pressure relief hole 508 is an indent in the cover 500 which tapers to a through hole. As illustrated, the pressure relief hole 508 is occluded by a ball 514 which prevents air from escaping until dislodged by pressure buildup within the pressure-cooking device. The pressure relief hole 508 is situated such that it is inside the gasket 504. In other embodiments, the pressure relief hole 508 may be any number of shapes and sizes or situated in various positions in the cover 500. In other embodiments, the pressure relief hole 508 may be a valve or manually activated device, and there may be a plurality of pressure relief devices.

The illustrated lid indent 510 is an indent within the cover 500 and allows a handle for a pot lid to fit within the pressure-cooking device when it is fully assembled. In some embodiments, there may be no lid indent 510 or the lid indent may be shaped and/or sized differently than shown.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. An unpowered pressure-cooking device, comprising:
   a) a base pot having a plurality of shells, the shells hermetically sealed together and forming a cavity therebetween and forming a receptacle thereinside;
   b) an inner pot shaped and sized to rest within the receptacle of the innermost shell and is selectably removeable therefrom, wherein the inner pot leaves a gap between the bottom of the inner pot and the bottom of the innermost shell when resting within the innermost shell;
   c) a nonmetallic thermal body shaped to fit within the gap, wherein the thermal body is a material selected from the group consisting of cement, brick, and stone;
   d) a pressure relief mechanism positioned to be in functional communication with an interior of the inner pot when the inner pot is disposed within the base pot; and
   e) a cover having a gasket shaped and positioned to hermetically seal an inside portion of the pressure-cooking device when closed, wherein the unpowered pressure-cooking device does not include any electrically powered heating elements.

2. The device of claim 1, wherein the thermal body is selectably removable from the inner and outer pot.

3. The device of claim 1, wherein the thermal body is a solid cylindrical shape.

4. The device of claim 1, wherein the gasket creates a hermetic seal with the top of the inner pot.

5. The device of claim 1, wherein the pressure relief mechanism includes a spring and a ball.

6. The device of claim 1, further including a lid which rests within the inner pot.

7. The device of claim 1, wherein the cover has a hollow interior.

8. The device of claim 1, wherein the pressure relief system is fully contained within the cover.

9. An unpowered pressure-cooking device, comprising:
   a) a base pot having a plurality of shells, the shells hermetically sealed together and forming a cavity therebetween and forming a receptacle thereinside;
   b) an inner pot shaped and sized to rest within the receptacle of the innermost shell and is selectably removeable therefrom, wherein the inner pot leaves a gap between the bottom of the inner pot and the bottom of the innermost shell when resting within the innermost shell;
   c) a nonmetallic removable thermal body shaped to fit within the gap, wherein the thermal body is the sole and only heating element of the unpowered pressure-cooking device and wherein the thermal body is a material selected from the group consisting of cement, brick, and stone;
   d) a cover having a gasket shaped and positioned to hermetically seal an inside portion of the pressure-cooking device when closed, wherein the unpowered pressure-cooking device does not include any electrically powered heating elements; and
   e) a pressure relief mechanism positioned to be in functional communication with an interior of the inner pot when the inner pot is disposed within the base pot, the pressure relief mechanism extending through the cover from a top surface thereof to a bottom surface thereof.

10. The device of claim 9, wherein the cover is selectably attachable to the base pot.

11. The device of claim 10, wherein the pressure relief mechanism includes a spring.

12. The device of claim 11, wherein the pressure relief mechanism includes a ball.

13. The device of claim 9, wherein the cover is hollow.

14. The device of claim 13, wherein the inner pot further includes handles which stick out of the device when the cover is closed.

15. The device of claim 14, wherein the gasket creates a hermetic seal with the top of the inner pot.

16. A unpowered pressure-cooking device, comprising:
   a) a base pot having a plurality of shells, the shells hermetically sealed together and forming a cavity therebetween and forming a receptacle thereinside;
   b) an inner pot shaped and sized to rest within the receptacle of the innermost shell and is selectably removeable therefrom, wherein the inner pot leaves a gap between the bottom of the inner pot and the bottom of the innermost shell when resting within the innermost shell;

c) a solid, nonmetallic cylindrical thermal body shaped to fit within the gap, the thermal body selectably removeable from the gap, wherein the thermal body is a material selected from the group consisting of cement, brick, and stone;
d) a pressure relief mechanism positioned to be in functional communication with an interior of the inner pot when the inner pot is disposed within the base pot; and
e) a cover having a hollow interior, as well as a gasket shaped and positioned to hermetically seal an inside portion of the pressure-cooking device when closed, wherein the unpowered pressure-cooking device does not include any electrically powered heating elements.

\* \* \* \* \*